US009764931B2

(12) United States Patent
Rintanen

(10) Patent No.: US 9,764,931 B2
(45) Date of Patent: Sep. 19, 2017

(54) SYSTEM AND METHOD FOR DETERMINING LOCATION AND SKEW OF CRANE GRAPPLING MEMBER

(75) Inventor: Kari Rintanen, Espoo (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 86 days.

(21) Appl. No.: 14/233,351

(22) PCT Filed: Jul. 17, 2012

(86) PCT No.: PCT/FI2012/050736
§ 371 (c)(1),
(2), (4) Date: Jan. 16, 2014

(87) PCT Pub. No.: WO2013/011200
PCT Pub. Date: Jan. 24, 2013

(65) Prior Publication Data
US 2014/0144862 A1   May 29, 2014

(30) Foreign Application Priority Data

Jul. 18, 2011   (FI) ...................... 20115757

(51) Int. Cl.
*B66C 13/46* (2006.01)
*B66C 13/18* (2006.01)
*G01C 3/02* (2006.01)

(52) U.S. Cl.
CPC .............. *B66C 13/46* (2013.01); *B66C 13/18* (2013.01); *G01C 3/02* (2013.01)

(58) Field of Classification Search
USPC ........................................ 212/276
See application file for complete search history.

(56) References Cited

U.S. PATENT DOCUMENTS

| 7,289,876 | B2 * | 10/2007 | Lussen | ................... B66C 13/46 212/275 |
| 7,387,393 | B2 * | 6/2008 | Reich | ............... G06K 19/06046 359/350 |
| 7,922,085 | B2 * | 4/2011 | Thomas | ................. B66C 13/46 235/384 |

(Continued)

FOREIGN PATENT DOCUMENTS

| AU | 703606 B2 | 3/1999 |
| CN | 1684900 A | 10/2005 |

(Continued)

*Primary Examiner* — Sang Kim
*Assistant Examiner* — Juan Campos, Jr.
(74) *Attorney, Agent, or Firm* — Birch, Stewart, Kolasch & Birch, LLP

(57) ABSTRACT

A system for determining the horizontal location and skew of a grappling member of a crane includes at least two types of reflectors arranged on the grappling member, the relative locations and shapes of which are known; at least one scanning distance sensor mounted on the crane to measure the distance and direction from the crane to the reflectors; and a data processing device arranged to store in its memory the relative locations and shapes of the reflectors; and to determine the horizontal location and skew of the grappling member on the basis of at least the relative locations and shapes of the reflectors and measured distances and directions from the crane to the reflectors.

18 Claims, 3 Drawing Sheets

(56) References Cited

U.S. PATENT DOCUMENTS

| | | | |
|---|---|---|---|
| 2002/0011576 A1* | 1/2002 | Cho | G11B 21/21 250/559.37 |
| 2002/0024598 A1* | 2/2002 | Kunimitsu | H04N 7/181 348/159 |
| 2005/0281644 A1* | 12/2005 | Lussen | B66C 13/46 414/403 |
| 2009/0030647 A1* | 1/2009 | Stocker | G01B 11/002 702/152 |
| 2011/0076130 A1* | 3/2011 | Stocker | B66C 13/46 414/815 |
| 2012/0092643 A1* | 4/2012 | Rintanen | B66C 13/46 356/4.01 |

FOREIGN PATENT DOCUMENTS

| | | |
|---|---|---|
| CN | 201161875 Y | 12/2008 |
| CN | 101655348 A | 2/2010 |
| EP | 1 894 881 A2 | 3/2008 |
| FI | 121402 B | 10/2010 |
| JP | 61-101389 A | 5/1986 |
| JP | H01-142402 A | 6/1989 |
| JP | H11-344305 A | 12/1999 |
| JP | 2002-22407 A | 1/2002 |
| WO | 2010/119180 A1 | 10/2010 |

\* cited by examiner

SYSTEM AND METHOD FOR DETERMINING LOCATION AND SKEW OF CRANE GRAPPLING MEMBER

FIELD OF THE INVENTION

The invention relates to a system and method for determining the horizontal location and skew of a crane grappling member. In the context of this invention, a crane refers to a device capable of lifting and handling loads, such as containers, under the control of man or automation. A specific application of the invention is the positioning of a container grapple of a container crane.

BACKGROUND OF THE INVENTION

The majority of international transport of goods takes place by means of containers 1. The containers are standard-shaped transport units in which goods are packed for the duration of transport. Typically, containers come in three different sizes of 20 feet, 40 feet or 45 feet in length. A container is about 2.5 meters wide.

The containers are handled in a container terminal (either in ports or inland) by particular container cranes, which include rail mounted gantry cranes (RMG cranes) and rubber-tyred gantry cranes (RTG cranes). A particular type of rail mounted gantry crane is a ship-to-shore crane used for lifting containers to be unloaded from a ship onto a quay and, correspondingly, for loading containers brought to a quay on board a container ship.

For handling containers, a specific container grapple is typically mounted on a container crane for gripping and lifting a container. The length of a container grapple may be altered according to the length of the container being handled.

A current aim is to automate the container cranes so as to make the work of a container crane operator easier and quicker, or the operator may be completely eliminated from the container handling machine, in which case the container handling machine operates without an operator, unmanned.

If the aim is to facilitate the operator's work, typically, then, a work phase in the work cycle is carried out automatically, controlled by a computer. The aim is then to speed up that particular work phase, to increase precision, reliability or safety, or merely to facilitate the operator's work.

If the operator is completely eliminated from the control cabin of the container handling machine and the container handling machine operates unmanned, a significant portion of the work phases of the container handling machine is then carried out automatically, controlled by a computer.

When the aim is to automate the operations of the container crane, one functionality to be automated is the automatic stacking of containers on top of each other and/or precise positioning of containers at desired locations on the ground. In such a case, a typically 5-cm precision is aimed at for the location of the container corners. If the container grapple is suspended from the container crane by means of lifting ropes or some other oscillating suspension, it is not possible to assume, due to wind and the asymmetric load and stretch of the lifting ropes, among other things, that the container grapple hangs at sufficient precision perpendicularly below the crane in a correct position.

A skilled person will understand that to place an upper container on top of a lower container at a desired location in the control of a computer, for instance, it is necessary to be able to measure accurately the sideways location, longitudinal location of the container grapple and the skew of the container horizontally and, if necessary, to guide the container grapple to the correct location. As is previously known, said locations and skew can typically be controlled for instance by stay control ropes mounted on the container grapple. A skilled person will understand that by mounting for instance four stay ropes at the corners of the container grapple in accordance with the prior art, it is possible to both move and turn the container grapple horizontally by adjusting the relative lengths of the control ropes. When automating a crane, it is possible to control especially the control ropes by means of a computer.

So that the upper container can be smoothly lowered on top of a lower container, for instance by using a computer, the precise elevation and longitudinal trim of the container being lowered should preferably be known to be able to adjust the trim to correspond to the lower container or ground by means of the lifting drum of the lifting ropes, and to slow down the lowering movement optimally just before the container touches the lower container or ground. A skilled person will understand that the evaluation of the longitudinal trim of the container, in particular, by measuring the skew of the lifting drums is unreliable due to the stretching of the lifting ropes and a possible unbalanced load in the container.

A prior-art system that is capable of determining the location and position of the container grapple consists of cameras mounted on the crane and active, infrared light-emitting beacons mounted on the container grapple. However, a drawback of this system is the high number and complexity of the cameras (at least two) and the beacons (at least three) mounted on the container grappling element, and consequently the high price of the equipment. In addition, the measuring accuracy of the elevation measurement and longitudinal trim is not sufficient for the applications described above.

SUMMARY OF THE INVENTION

It is thus an object of the invention to provide a system and a method so as to enable at least one above-mentioned problem to be alleviated or eliminated.

The positioning system of a container grapple according to the invention is based on a scanning distance sensor mounted on the container crane and to reflectors in the container grapple. A distance sensor is typically a sensor based on laser technology, especially the measurement of the travel time of a laser beam, but the system according to the invention may also be implemented with another sensor providing corresponding measured quantities. In terms of the invention, a reflector is an object in the container grapple and has a well-defined set of characteristics enabling the reflector to be distinguished from other objects in the field of vision of the scanning distance sensor. Such a set of characteristics includes at least the shape and/or relative location of the reflector. The shape of the object in the field of vision of the distance sensor may be determined for instance by measuring the distance to the object in a plurality of directions at time intervals short enough to make it possible to ignore the movement (sway) of the container grapple during the measurement of the plurality of directions and the distance. If the shape of the object detected on the basis of the plurality of directions and the distance corresponds to the shape of the reflector stored in the memory of a data processing device, the detected object may be considered to be a reflector. Alternatively, it is possible to determine that the object is a reflector on the basis of its relative location.

In addition to shape and relative location, the set of characteristics of the reflector may by way of example also include colour.

The invention and its preferred embodiments enable the use of the same sensor in the determination of both the horizontal location and position (x_spr, y_spr, skew) of the container grapple and the vertical location and trim (h_spr, trim) thereof. By using the same sensor for several different purposes, it is possible to achieve significant cost savings and facilitate the calibration of the equipment.

LIST OF FIGURES

The invention will now be described in more detail by means of a preferred working example and with reference to the attached drawings, in which FIG. 1 is a side view of a container crane, container grapple and reflectors mounted thereon, while the container crane is stacking a container on top of another container;

DETAILED DESCRIPTION OF THE INVENTION

Figure 1:
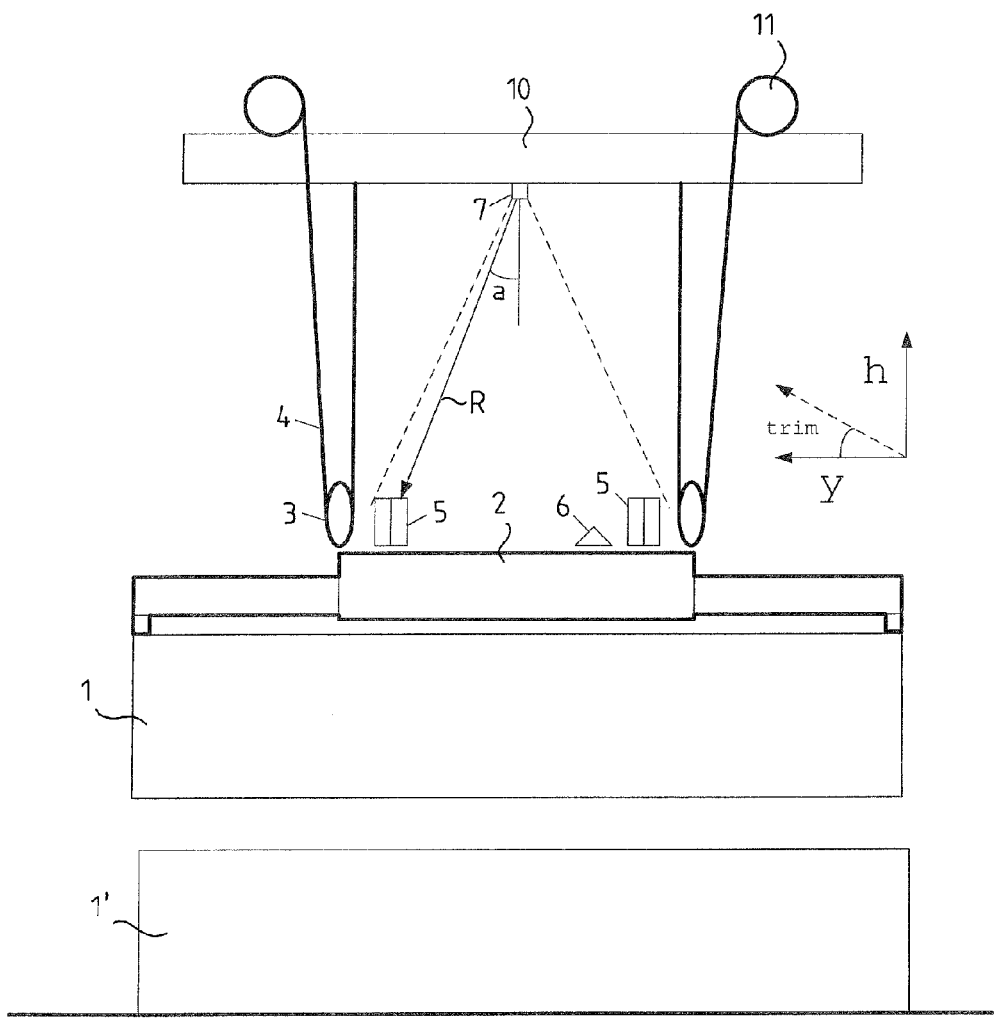

The invention will be described using as an illustrative but non-limiting example a container crane 10 in which a loading member, herein a container grapple 2, hangs from the container crane 10 (typically from a specific trolley) by specific lifting ropes 4 and lifting wheels 3 (FIG. 1). By rotating lifting drums 11, the length of the lifting ropes 4 can be altered and, consequently, the container grapple 2 lifted and lowered. By lengthening or shortening the front and back end lifting ropes 4 by different lengths, it is possible to alter the longitudinal trim of the container grapple 2. This may be necessary when the container 1 to be moved is to be stacked on top of a lower container 1' in such a manner that the front and back ends of the upper container touch the lower container (or ground) at the same time. This is most preferable when attempting to position the container precisely.

Figure 2:
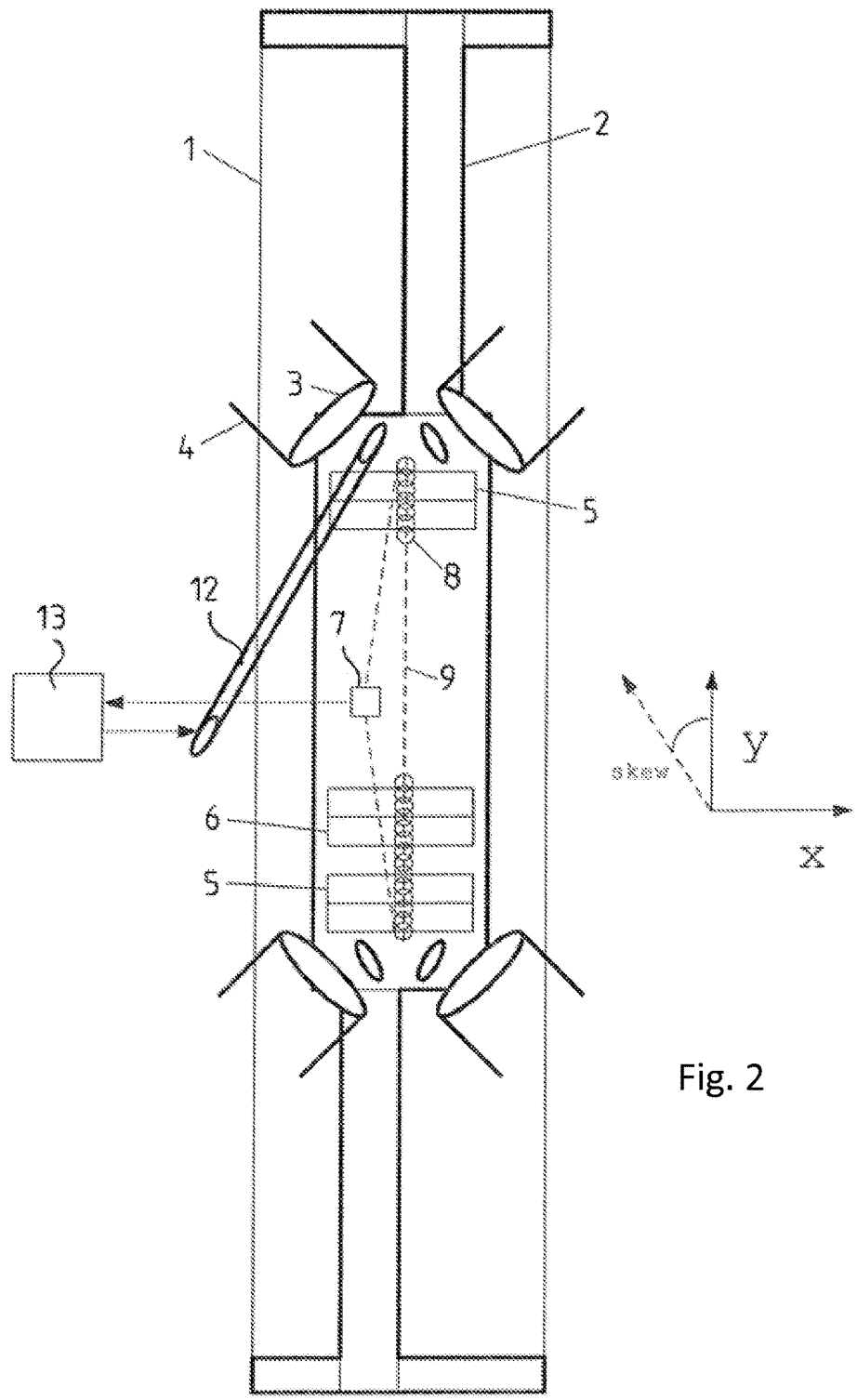
FIG. 2 is a top view of the container crane grapple and reflectors mounted thereon.
Figure 3:
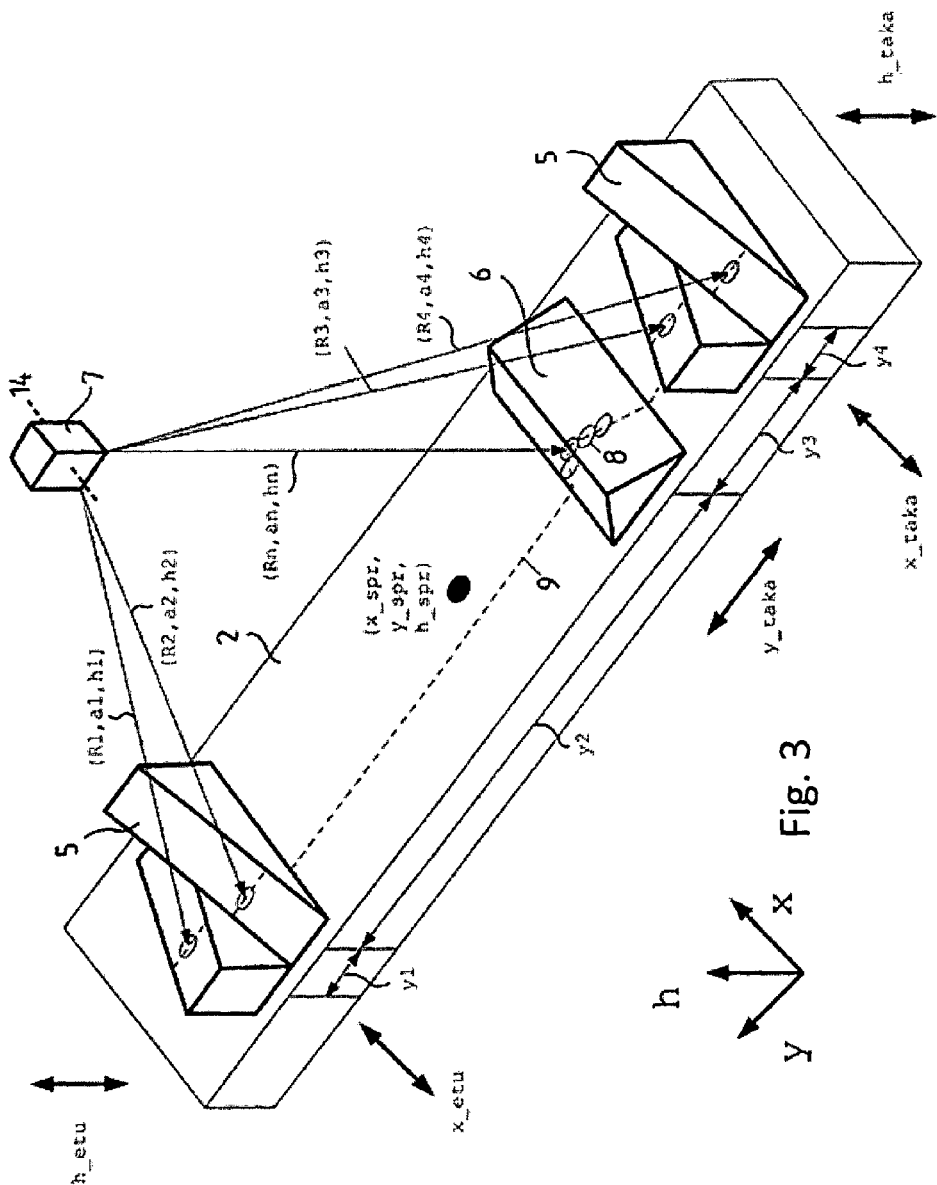
FIG. 3 illustrates preferred shapes of the reflectors and the variables used in detecting the reflectors.

FIGS. 1, 2, and 3 show the operating principle of a scanning laser sensor 7 and an installation according to the invention on the container crane 10. The laser distance sensor emits a laser light pulse which is reflected from an object 5, 6 hitting upon a beam 8, and some of the laser light returns to a light receiver of the laser distance sensor. The laser distance sensor determines the travel time of light between emitting and receiving the light pulse and on the basis of the travel time calculates a distance R of the reflecting object. The laser distance sensor is fastened to a rotor rotating about a vertical axle 14 relative to the laser beam, and laser light pulses 8 are emitted at a high rate. Typically, then, the laser beams 8 overlap one another, in which case no gaps are left between the laser beams, enabling the detection of even small objects. The scanning laser distance sensor 7 also measures an emission angle a of the laser beam 8 with its internal sensor.

As shown in FIG. 2, four stay control ropes 12 (only one shown) are also installed at the corners of the container grapple 2, and it is possible to move the container grapple 2 sideways and turn it horizontally by altering their relative lengths. These control ropes 12 can be controlled by means of a data processing device 13 (computer).

In an embodiment of the method of the invention, one laser sensor 7 is mounted on the framework of the container crane 10 as directly above the container grapple 2 as possible in such a manner that a track 9 drawn by the beams 8 hits lengthwise the top surface of the container grapple (FIG. 2) in such a manner that the laser distance sensor detects the three reflectors 5, 6 mounted on the top surface of the container grappling element. The laser distance sensor is capable of reliably detecting reflectors made of a metal sheet and painted in a light colour, for example, typically even at 30 meters. The reflectors can naturally also be made of some other material.

Typically, the sensor 7 provides the following information for each individual laser distance measurement: measurement angle a, measured distance R, and possibly also reflection strength I. As stated above, the system according to the invention may also be implemented with other sensors providing measured variables $\{a, R\}$ or $\{a, R, I\}$, and is thus not restricted to the use of laser technology only.

A skilled person will understand that when, for instance, the laser beams of the scanning laser sensor hit upon the reflector as shown in FIG. 3, it is possible to calculate from the angle values a and the distance readings R measured by the sensor 7 measured coordinates (h,y) of the reflector surface in relation to the sensor 7 and container crane 10 by formula (1):

$$h = R \cos(a)$$
$$y = R \sin(a) \quad (1)$$

In the following, an implementation of the method of the invention will be described in more detail. The first step comprises determining the longitudinal location (y_taka) of the triangular reflector 6 in relation to the sensor 7 and container crane 10, FIG. 3. Because the longitudinal movement range of the container grapple 2 is, due to the ropes 4, 12, typically limited to +/−100 cm, the examination is restricted to the reflections 8 (Rn, an) measured by the distance sensor 7, whose y values calculated by formula (1) are at +/−100 cm from the known longitudinal idle location of the reflector 6 (when the container grapple 2 is directly below the crane 10). Assuming that the parts of the container grapple 2 around the reflector 6 are located lower than the reflector 6, the peak of the reflector 6 can be positioned roughly by selecting from consecutive reflections (Rn, an) the one with the highest height value h calculated by formula (1):

$$y\_taka = Rn \sin(an) \quad (2)$$

n=reflection that maximizes the clause [Rn cos (an)]

A skilled person will also understand that the thus defined value y_taka can, if necessary, be further defined by examining several reflections (Rn, an) hitting the reflector 6 and by fitting the known shape of the reflector 6 to the measured values. A skilled person will understand as well that possible sideways displacements (x_etu, x_taka) of the container grapple 2 do not affect the detection of the reflector 6 of the type shown in FIG. 3.

After the longitudinal location y_taka of the container grapple has been defined, the second step comprises calculating theoretical longitudinal locations of wedge-like reflectors 5 on the basis of the relative longitudinal locations (y1, y2, y3, y4) of the reflectors 5, 6, FIG. 3. The reflections (R1,a1 ... R4,a4), whose longitudinal values y calculated by formula (1) best correspond to the theoretical values, are then selected from the reflections measured by the distance sensor 7.

The third step comprises calculating height values h1 . . . h4 from the reflections (R1,a1 . . . R4,a4) according to formula (1). When using the wedge-like reflectors 5 according to FIG. 3 in positioning, the difference between height values h1 and h2 (and between h3 and h4, respectively) is linearly dependent on the sideways location of the container grapple as follows:

$$x\_etu = A(h1-h2) + B\_etu$$

$$x\_taka = A(h3-h4) + B\_taka, \quad (3)$$

wherein constant A is determined on the basis of the shape of the reflectors 5 and calibration factors B_etu and B_taka are determined on the basis of the installation of the reflectors and distance sensor 7. If the sideways trim of the distance sensor 7 differs from the vertical, a skilled person will understand that the calibration factors B_etu and B_taka are then linearly height-dependent (h) and need to be calibrated separately.

According to an embodiment of the method of the invention, the exact height of the reflectors can also be defined as follows:

$$h\_etu = (h1+h2)/2$$

$$h\_taka = (h3+h4)/2 \quad (4)$$

Finally, the location of the centre point and the positions of the container grapple are defined. The longitudinal location of the container grapple 2 is determined by measured value y_taka as follows:

$$y\_spr = y\_taka + C, \quad (5)$$

wherein calibration constant C is determined according to the known relative location of the reflector 6 and the installation of the distance sensor 7. The location of the centre point and the skew of the container grapple 2 are calculated from values x_etu and x_taka as follows:

$$x\_spr = (x\_etu + x\_taka)/2$$

$$\text{skew} = \arctan 2[x\_etu - x\_taka, D], \quad (6)$$

wherein D is the known distance of the reflectors 5.

According to an embodiment of the method of the invention, it is possible to calculate the height of the centre point and the longitudinal trim of the container grapple 2 by using values h_etu and h_taka as follows:

$$h\_T = (h\_etu + h\_taka)/2$$

$$\text{trim} = \arctan 2[h\_etu - h\_taka, D] \quad (7)$$

It will be apparent to a person skilled in the art that as technology advances, the basic idea of the invention may be implemented in many different ways. The invention and its embodiments are thus not restricted to the examples described above but may vary within the scope of the claims. For instance, by placing the distance sensor on the container grapple and the reflection surfaces on the crane, it is possible to implement essentially the same operations and obtain the same result.

The invention claimed is:

1. A system for determining a horizontal location and skew of a grappling member of a crane, wherein the system comprises:
    at least two types of three-dimensional reflectors arranged on a top surface of the grappling member and having known relative locations and shapes, wherein an upper surface of the reflectors comprises at least one inclined surface with respect to a horizontal plane;
    a scanning sensor mounted on the crane and arranged to measure a distance from the crane to each of the reflectors, and an emission angle for each of the reflectors, and
    a data processing device, including a memory, configured to:
        store in the memory the known relative locations and shapes of the reflectors; and determine the horizontal location and skew of the grappling member on the basis of at least the known relative locations and three-dimensional shapes of the reflectors and measured distances and emission angles from the crane to the reflectors.

2. The system as claimed in claim 1, wherein the system is further arranged to determine known height or a longitudinal trim of the grappling member.

3. The system as claimed in claim 2, wherein the at least two types of three-dimensional reflectors includes one reflector type that determines a longitudinal location of the grappling member, wherein the one reflector type is positioned on the basis of a shape of the one reflector type.

4. The system as claimed in claim 1, wherein the at least two types of three-dimensional reflectors includes one reflector type that determines a longitudinal location of the grappling member, wherein the one reflector type is positioned on the basis of a shape of the one reflector type.

5. The system as claimed in claim 4, wherein the at least two types of three-dimensional reflectors further includes the other reflector types used to determine a sideways location and skew of the grappling member, and the other reflector types are positioned on the basis of the relative location information of the other reflector types.

6. The system as claimed in claim 1, wherein the scanning sensor is a laser sensor.

7. The system as claimed in claim 1, wherein the system is arranged to control the crane automatically.

8. The system as claimed in claim 1, wherein the crane is arranged to move unmanned.

9. The system as claimed in claim 1, wherein the crane is a container crane and the grappling member is a container grapple.

10. The system as claimed in claim 1, wherein said scanning sensor is arranged directly above the grappling member, and scanning paths for all the reflectors coincide with each other to form a line extending lengthwise on the top surface of the grappling member.

11. A method for determining a horizontal location and skew of a grappling member of a crane, wherein the method uses at least two types of three-dimensional reflectors arranged on a top surface of the grappling member, relative locations and shapes of which are known; wherein an upper surface of the reflectors comprises at least one inclined surface with respect to a horizontal plane; a scanning distance sensor mounted on the crane to measure a distance from the crane to each of the reflectors and an emission angle for each of the reflectors; and a data processing device including a memory, the data processing device executing the following steps:
    receiving from said scanning distance sensor distances and emission angles from the crane to each of the reflectors
    storing in memory the relative locations and shapes of the reflectors; and
    determining the horizontal location and skew of the grappling member on the basis of at least the relative locations and three-dimensional shapes of the reflectors and measured distances and directions from the crane to the reflectors.

12. The method as claimed in claim 11, further comprising the step of determining a height or a longitudinal trim of the grappling member.

13. The method as claimed in claim 11, wherein the at least two types of three-dimensional reflectors includes one reflector type that determines a longitudinal location of the grappling member, wherein the one reflector type is positioned on the basis of a shape of the one reflector type.

14. The method as claimed in claim 13, wherein the at least two types of three-dimensional reflectors further includes the other reflector types used to determine a sideways location and skew of the grappling member, and the other reflector types are positioned on the basis of the relative location information of the other reflector types.

15. The method as claimed in claim 11, wherein a laser sensor is used as the single scanning distance sensor.

16. The method as claimed in claim 11, wherein the crane is automatically controlled.

17. The method as claimed in claim 11, wherein the crane is moved unmanned.

18. The method as claimed in claim 11, wherein the crane is a container crane and the grappling member is a container grapple.

* * * * *